United States Patent
Kuchibhotla et al.

(10) Patent No.: US 9,904,534 B2
(45) Date of Patent: Feb. 27, 2018

(54) INTER-TENANT AND INTRA-TENANT FLOCK MANAGEMENT

(71) Applicant: Oracle International Corporation, Redwood Shores, CA (US)

(72) Inventors: Balasubrahmanyam Kuchibhotla, San Ramon, CA (US); Hariprasanna Srinivasan, San Francisco, CA (US); Bharat Paliwal, Fremont, CA (US); Kamaldeep Khanuja, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 179 days.

(21) Appl. No.: 14/849,467

(22) Filed: Sep. 9, 2015

(65) Prior Publication Data

US 2016/0350098 A1 Dec. 1, 2016

Related U.S. Application Data

(60) Provisional application No. 62/168,682, filed on May 29, 2015.

(51) Int. Cl.
*G06F 9/44* (2006.01)
*G06F 9/445* (2018.01)
*H04L 29/08* (2006.01)

(52) U.S. Cl.
CPC .............. *G06F 8/65* (2013.01); *H04L 67/10* (2013.01); *H04L 67/34* (2013.01); *G06F 8/60* (2013.01); *G06F 9/44505* (2013.01)

(58) Field of Classification Search
None
See application file for complete search history.

(56) References Cited

U.S. PATENT DOCUMENTS

| | | | |
|---|---|---|---|
| 7,213,232 B1 | 5/2007 | Knowles | |
| 7,458,073 B1 | 11/2008 | Darling et al. | |
| 7,624,377 B2 | 11/2009 | Wu | |
| 7,827,547 B1 | 11/2010 | Sutherland et al. | |

(Continued)

OTHER PUBLICATIONS

U.S. Appl. No. 14/603,741, filed Jan. 23, 2015, Office Action, dated Jun. 19, 2015.

(Continued)

*Primary Examiner* — Qamrun Nahar
(74) *Attorney, Agent, or Firm* — Invoke

(57) ABSTRACT

Techniques are described for inter-tenant and intra-tenant software management services in a cloud environment. In an embodiment, a network service determines a target end state for a software product that is deployed by a set of one or more tenants. The network service generates, for the set of one or more tenants, a cacheable object for updating the software product to the target end state. The network service generates, for a particular tenant in the set of one or more tenants, tenant-specific configuration data for applying configurations associated with the respective tenant and target-specific configuration data for applying configurations associated with a respective deployment of the software product. The network service sends the cacheable object to each tenant of the set of one or more tenants and the configuration data to the particular tenant.

40 Claims, 8 Drawing Sheets

(56) References Cited

U.S. PATENT DOCUMENTS

| | | | |
|---|---|---|---|
| 7,908,589 B2 | 3/2011 | Sattler et al. | |
| 8,281,307 B2 | 10/2012 | Arnold et al. | |
| 8,347,263 B1 * | 1/2013 | Offer | G06F 8/71 |
| | | | 717/174 |
| 8,402,437 B2 * | 3/2013 | Dhanakshirur | G06F 8/20 |
| | | | 717/121 |
| 8,490,054 B2 | 7/2013 | Dattathreya | |
| 8,667,465 B2 | 3/2014 | Poole | |
| 8,762,945 B2 | 6/2014 | Arnold et al. | |
| 2011/0225275 A1 | 9/2011 | Shah et al. | |
| 2012/0278902 A1 * | 11/2012 | Martin | G06F 8/313 |
| | | | 717/172 |

OTHER PUBLICATIONS

U.S. Appl. No. 14/603,741, filed Jan. 23, 2015, Interview Summary, dated Sep. 22, 2015.
U.S. Appl. No. 14/603741, filed Jan. 23, 2015, Notice of Allowance, dated Oct. 26, 2015.
Ping et al., A Change-Oriented Conceptual Framework of Software Configuration Management, IEEE, pp. 1-4, dated 2007.
Faulkes et al., Software Configuration Management and Its Contribution to Reliability Program Management:, IEEE Transactions on Reliability, vol. R-32, No. 3, pp. 289-292, dated 1983.

\* cited by examiner

INTER-TENANT AND INTRA-TENANT FLOCK MANAGEMENT

CROSS-REFERENCE TO RELATED APPLICATIONS; BENEFIT CLAIM

This application claims the benefit of Provisional Appln. 62/168,682, filed May 29, 2015, the entire contents of which is hereby incorporated by reference as if fully set forth herein, under 35 U.S.C. § 119(e).

This application is related to U.S. application Ser. No. 14/603,741, filed Jan. 23, 2015, entitled "Image Advisor"; U.S. application Ser. No. 14/603,764, filed Jan. 23, 2015, entitled "Populating Content for a Base Version of an Image"; U.S. application Ser. No. 14/603,775, filed Jan. 23, 2015, entitled "Creation of a Software Configuration Signature for Software"; U.S. application Ser. No. 14/603,532, filed Jan. 23, 2015, entitled "Version Management of Images"; U.S. application Ser. No. 14/603,804, filed Jan. 23, 2015, entitled "Drift Management of Images"; U.S. application Ser. No. 14/660,679, filed Mar. 17, 2015, entitled "Deployment and Activation of Updates on Target Hosts"; and U.S. application Ser. No. 14/660,687, filed Mar. 17, 2015, entitled "Circular Buffer of Software Versions", the entire contents for each of which is hereby incorporated by reference as if fully set forth herein.

TECHNICAL FIELD

The present disclosure relates to managing upgrades and standards of deployed resources. The disclosure relates more specifically to network services for updating and managing software resources for tenants in a cloud environment.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Many datacenters undergo two major types of transformations over time. First, a typical datacenter experiences significant growth with an ever increasing number of software deployments. Second, the software architecture within the datacenter is typically improved or updated with advancements in technology or changes to the underlying deployment models. These transformations frequently lead to software deployments that are siloed, dispersed, varied and complex. Some enterprise deployments have hundreds and thousands of software deployments across multiple versions and various software patch levels.

The ever-increasing and divergent nature of software deployments within a datacenter leads to significant challenges for system administrators. A large, varied, distributed environment may demand quite a number of out of band emergency and ad-hoc changes to keep the systems performing properly. As the differences continue to exist and grow with additional deployments and updates, the risk of unpredictable failures and unplanned downtimes may increase. In addition, the varied and complex nature of the software deployments may result in poor resource utilization and cause issues with planned maintenance windows.

BRIEF DESCRIPTION OF THE DRAWINGS

Various embodiments are illustrated by way of example, and not by way of limitation, in the figures of the accompanying drawings and in which like reference numerals refer to similar elements and in which.

DETAILED DESCRIPTION

Figure 1:
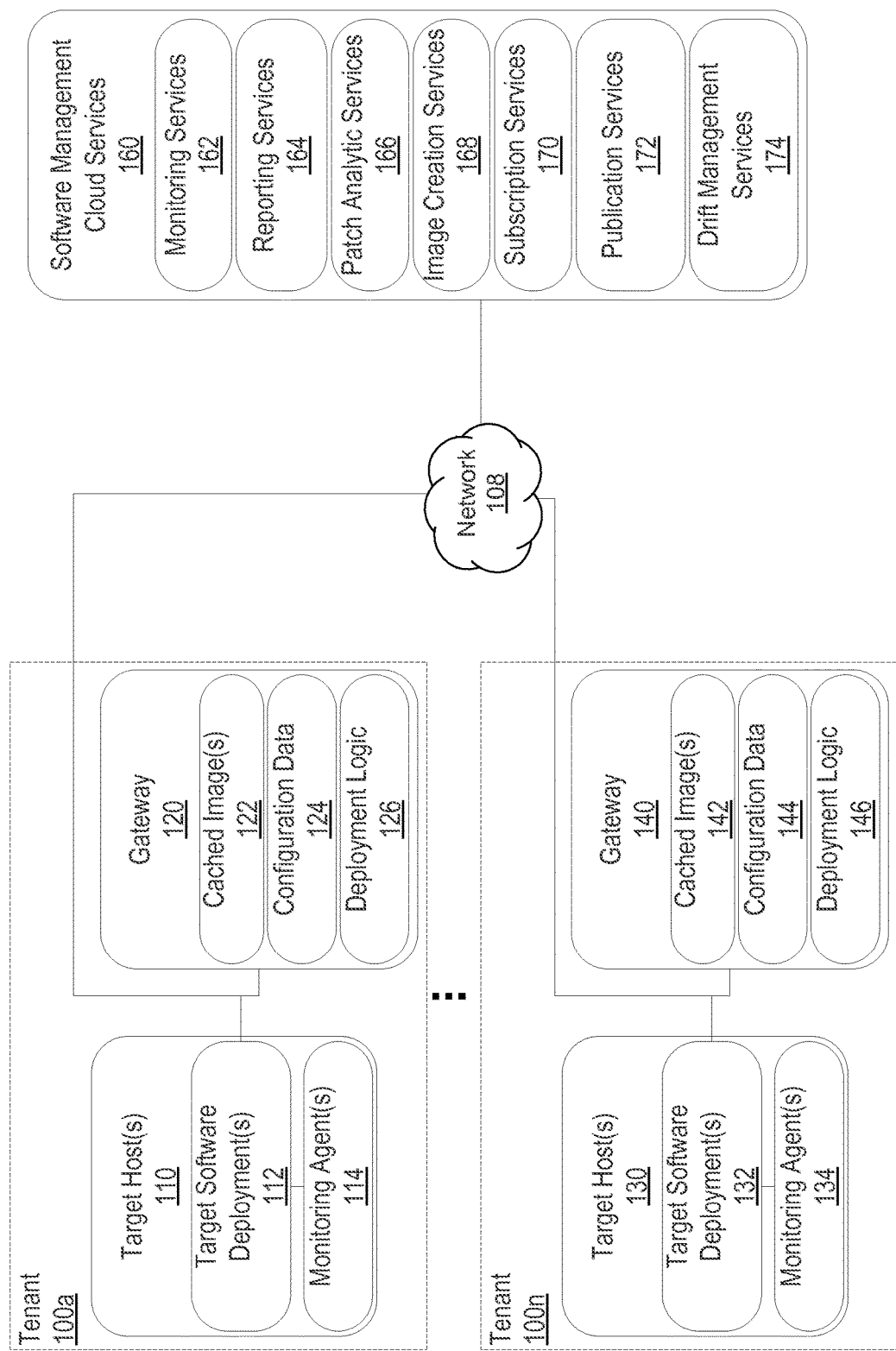
FIG. 1 illustrates an example cloud environment that manages software updates and standardization for target deployments within a single tenant and across different tenants.

In the following description, for the purposes of explanation, numerous specific details are set forth in order to provide a thorough understanding of the disclosure. It will be apparent, however, that the present invention may be practiced without these specific details. In other instances, structures and devices are shown in block diagram form in order to avoid unnecessarily obscuring the present invention.

General Overview

In various embodiments, computer systems, stored instructions, and technical steps are described for managing software deployments in a Software-as-a-Service (SaaS) or other cloud environment. The cloud environment may offer a variety of cloud services for reducing configuration pollution, optimizing software configurations, and deploying software updates. Shifting management to the cloud environment reduces administrative demands on the part of the tenant, in particular where the tenant's datacenter environment is siloed, dispersed, varied and complex. The tenants may rely on the cloud services to reduce configuration pollution, promote standardization, and optimize software configurations, which may improve the manageability, security, and performance of the tenant's software deployments.

The techniques described herein may be used to provide patching-as-a-service among other cloud services for managing and maintaining software deployed at tenant sites. The cloud services offered may include, without limitation, recommending patches to update deployments, generating software images that incorporate patch set updates, publishing newly released updates, analyzing/monitoring the state of a software deployment, and reconciling rogue targets. Information may be shared across different tenants within the cloud environment to leverage information from a variety of sources and improve software deployment performance.

In one embodiment, a network service determines a target end state for a software product that is deployed by a set of one or more tenants. The network service generates, for the set of one or more tenants, a cacheable object for updating the software product to the target end state. The network service generates, for a particular tenant in the set of one or more tenants, tenant-specific configuration data for applying configurations associated with the respective tenant and target-specific configuration data for applying configurations associated with a respective deployment of the software product. The network service sends the cacheable object to each tenant of the set of one or more tenants and the configuration data to the particular tenant.

Inter and Intra-Tenant Software Management Services

According to one embodiment, a cloud environment provides a set of network services for managing deployments of a software product, where the configurations of the deployments may be varied and dispersed within a single tenant's environment and/or across different tenants' environments. The terms "cloud service" and "network service" are used herein interchangeably and generally refer to resources that are made available to tenants via one or more interconnected computer networks such as the Internet. The services may be implemented according to a Software as a Services (SaaS) or some other cloud deployment model. Where multiple network services are described, it may be possible to execute the network services on a single physical server and/or group the network services into one logical service offering. Similarly, where a single network service is described, it may be possible to distribute the network service between multiple physical logic components and/or to divide the network service into a plurality of underlying network services. Thus, unless the context otherwise clearly indicates, the terms used in the singular may include the plural and the plural may include the singular.

FIG. 1 illustrates an example cloud environment that manages software updates and standardization for target deployments within a single tenant and across different tenants. The cloud environment comprises tenants $100a$ to $100n$, network 108, and software management services 160. Tenants $100a$ to $100n$ represent one or more entities—such as customers, subscribers, or accounts—that are authorized to access one or more services provided by software management cloud services 160. Tenants $100a$ to $100n$ may generally access software management services 160 through any network host that is connected to network 108, where network 108 represents one or more interconnected computer networks such as the Internet. In some embodiments, tenants $100a$ to $100n$ may subscribe to software management services 160 and/or pay based on their service usage for maintaining or otherwise managing target software deployments.

Software management services 160 provide a set of cloud services for managing versions of a software product deployed by tenants $100a$ to $100n$. In one embodiment, software management services 160 include monitoring services 162, reporting services 164, patch analytic services 166, image creation services 168, subscription services 170, publication services 172, and drift management services 174. Each of these services performs a distinct set of functions that are described in further detail below. Software management services 160 may offer additional services that are not illustrated for purposes of brevity. For example, software management services 160 may include authentication services for authenticating tenants before permitting access to the other cloud service offerings. In other embodiments, one or more of the management services may be omitted or restricted to certain tenants. Each of the cloud services may be hosted by a set of computing resources that may be shared by tenants $100a$ to $100n$.

Each of tenants $100a$ to $100n$ is associated with one or more target software deployments and one or more gateways. For instance, tenant $100a$ is associated with target deployments 112, which execute on target hosts 110, and tenant $100n$ is associated with target deployments 132, which execute on target hosts 130. Gateways 120 and 140 store cached images 122 and 142, respectively and configuration data 124 and 144, respectively. Gateway 120 further includes deployment logic 126 for updating target software deployments 112 and/or monitoring agents 114 based on the cached images and configuration data. Similarly, gateway 140 includes deployment logic 146 for updating target software deployments 132 and/or monitoring agents 134.

Monitoring agents 114 and 134 monitor and collect metadata from the respective targets software deployments. The metadata generally comprises information that identifies a set of one or more attributes of the respective software deployment being monitored. In one embodiment, the attribute metadata describes the set of source components that are associated with the respective target deployment. A "source component" in this context may include, without limitation, sets of instructions and/or configurations that have been made as the result of, for example, patching, configuring, modifying, updating, or newly provisioning or initializing software.

Deployment Monitoring and Classification Across Multiple Tenants

In one embodiment, monitoring services 162 includes logic for collecting metadata from tenants $100a$ to $100n$. Monitoring services 162 may receive metadata from monitoring agents 114 and 134 on a periodic, continuous, or on-demand basis, depending on the particular implementation. Upon receiving the metadata, monitoring services 162 may store the metadata, including mapping data that maps metadata to the tenant from which the metadata was received, for subsequent analysis. The metadata may be used to identify the current levels of configuration and the source components of the target software deployments. Patch analytic services 166 may then analyze the metadata to identify configuration pollution with a single tenant's environment as well as configuration differences between different tenant environments.

The metadata received from a particular tenant may identify a set of primary attributes and a set of secondary attributes for the target software deployments that are being monitored. A primary attribute is an attribute that does not change between different deployments of the same software product/resource. Primary attributes may be used to describe a base version of a software deployment. Example primary attribute may include, without limitation:

Target type: This attribute primarily classifies targets at the product level, such as identifying the product name and vendor. This attribute may further identify the architecture model of the product. For example, some database management systems support deployment on a standalone server, within a clustered environment, etc.

Software release version: This attribute identifies the release version of the target resource. There may be multiple release versions available in a data center environment. A given release may have multiple deployments with varying patches.

Operating system (or platform) version: This attribute identifies an operating system (OS) or other platform where the software is hosted. There may be more than one OS type in a datacenter. Thus, the same product may be classified differently when executed on different platforms.

The target software deployments may further be classified based on an applied patches attribute. This attribute identifies critical patch updates (CPU), patch set updates (PSUs) or other patches have been applied at the target. A "patch" as used herein may comprise a plug-in, bug fix, feature improvement, custom-defined modification and/or some other update to a software deployment. The patch may change the software binary, such as a program executable, when applied. Different deployments of the same software product may have patches that were applied at one target deployment, but not another.

Secondary attributes are attributes that may differ between different deployments of the same software resource. Secondary attributes may be used to fine grain the configuration classification of a target further. Examples of secondary attributes may include, without limitation:

Supported application: This attribute identifies applications that are supported by a target. For example, a database management system may be used to support customer relationship management (CRM) applications, business intelligence (BI) applications, etc.

Location: This attribute identifies a location of the target. For example, a given application may be deployed in geographically distinct data centers that are managed by the same standardization management logic. The attribute may identify the geographic region and/or particular datacenter to which the target belongs.

Line of Business: This attribute identifies a line-of-business (LOB) supported by the target. For example, the LOB may include different categories such as accounting, supply chain management, human resources, etc.

Tenant: This attribute identifies a tenant with which the target is associated. Some datacenters support multi-tenant environments, where different targets belong to or are otherwise associated with different tenants.

Custom properties: A user may create custom properties for the targets. For example, an administrator may define a security level attribute to classify highly sensitive targets separately from other targets within the same data center.

Patch analytic services 166 may use the attributes to identify unique software configurations within a particular tenant and across different tenants. As an example, target software deployments that share a common target type, software release, operating system, and patch set update may be grouped into a single, unique configuration classification. In other examples, additional secondary attributes may be used to fine grain the classifications. For instance, groups that belong to different locations, LOBs, and/or tenants may be grouped separately.

Classifications may further be based on input received from a particular tenant. For example, a particular tenant may select a group of a set of target deployments of a software product together based on custom criteria.

The primary and secondary attributes identified above a given by way of example, but may vary from implementation to implementation. For some software deployments, one or more of the primary attributes identified above may be a secondary attribute or vice versa. In some embodiments, primary and secondary attributes may be determined based on domain-specific rules or other information that apply to a particular application domain. Thus, the primary attributes that define one software configuration classification may differ from the primary attributes of another software configuration classification.

End State Computation and Image Creation Services

In one embodiment, image creation services 168 includes logic for defining a target end state for deployments of a particular software product. The term "end state definition" as used herein refers to a logical description of a set of attributes that represent a state of a software deployment. As an example, the end state definition may comprise data that defines or otherwise identifies a set of source components and other target attributes, such as the target type, software version, operating system, and recommended patches. A target deployment satisfies the end state when the source components and attributes match the end state definition.

Image creation services 168 may compute the end state definition based on a variety of sources including, without limitation:

Vendor recommended patches for a target software deployment;

Patch recommendation responsive to a tenant's support ticket;

Patches requested by a tenant; and/or

Patches that are identified as a part of a predictive performance and log analytics process within the cloud environment.

Image creation services 168 may analyze one or more of the sources to determine which source components to include within an end state definition for a target software deployment.

In one embodiment, image creation services 168 includes logic for creating a gold image based on an end state definition. A "gold image" or "image" in this context refers to a cacheable object that may be used to install, execute, and/or update source components for a target software deployment such that the target software deployment satisfies the corresponding end state definition. In one embodiment, the software image is a physical software binary that represents the end state definition. In order to create the gold image, image creation services 168 determines the source components identified by the end-state definition. For example, image creation services 168 may determine the base version of the software plus the patches identified in the end state definition. Image creation services 168 then generates a gold image by generating a binary payload that includes the source components identified by the end-state definition.

The manner in which image creation services 168 generates the payload data for the gold image may vary from implementation to implementation. As an example, image creation services 168 may obtain a base executable binary for a software deployment and a set of patches for modifying the binary. The base executable binary and/or patches may be obtained from the software product vendor, a reference target, a tenant, and/or some other source. Once obtained, image creation services may apply the identified set of patches to the base executable binary to create the gold image.

Subscription Services

A cacheable object such as a gold image may be used to update target deployments on an intra-tenant or inter-tenant basis, depending on the particular implementation. In the intra-tenant context, the cacheable object is shared between different target software deployments associated with a single tenant. As an example, the cacheable object may be shared between different operating divisions of a single customer to allow the different operating divisions to be standardized and stay current with the latest vendor recommendations. In the inter-tenant context, a cacheable object may be shared between target software deployments that belong to different tenants. This allows tenants to apply updates such that their software deployments are current with other tenants in the cloud environment.

In one embodiment, subscription services 170 maintains a set of subscription data that maps tenants and their associated target deployments to an end state definition and the respective gold image generated for the end state definition. A group of target software deployments that subscribe to the same end state definition/gold image are herein referred to as a "flocking group". The gold image acts as the lead for the flocking group. As the gold image is being revised for changes, the subscribed targets follow the gold image to keep up with the latest versions. A flocking group may span multiple tenants when target software deployments from different tenants subscribe to the same gold image.

Figure 2:
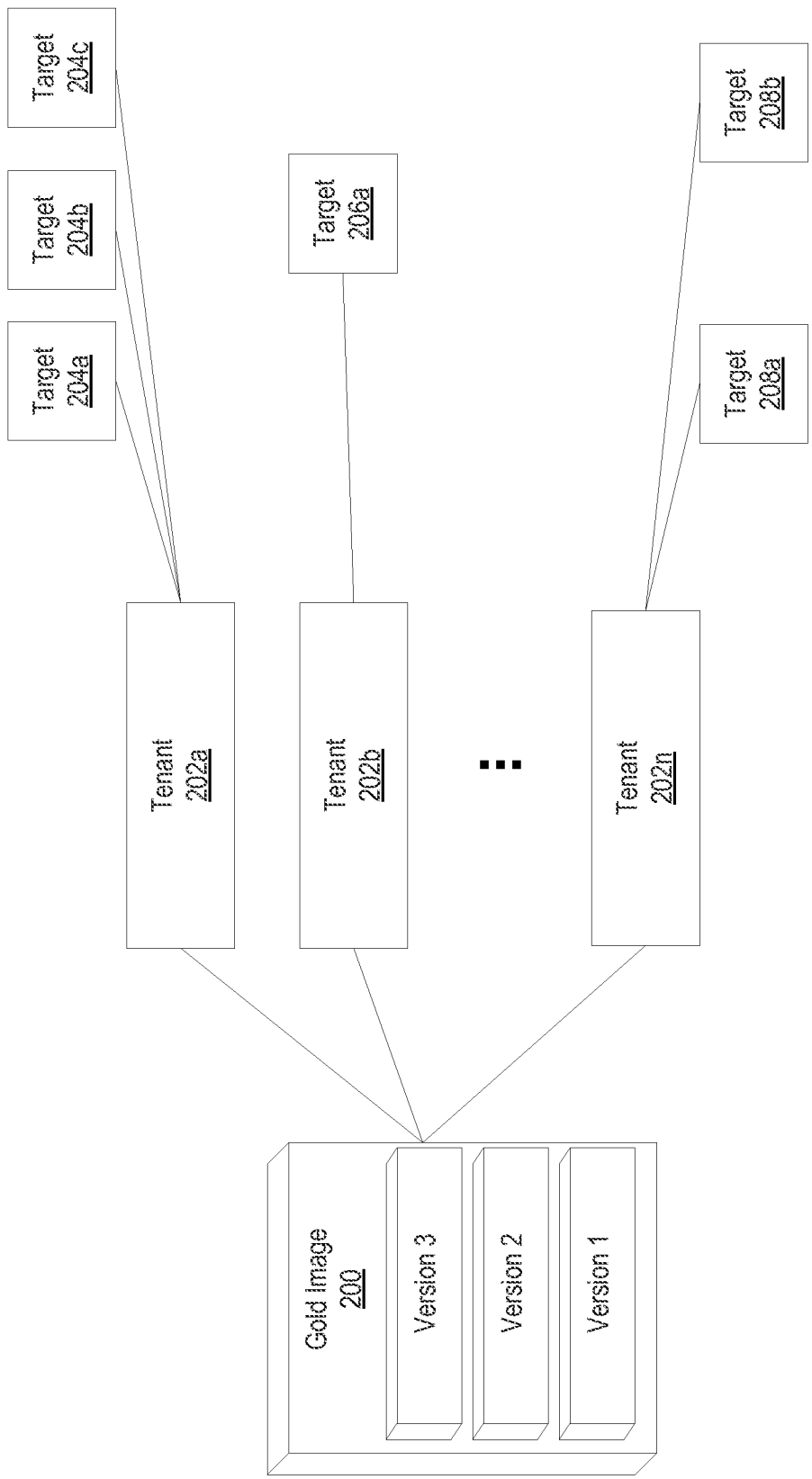
FIG. 2 illustrates a set of tenants and targets that subscribe to a gold image and follow the updates to the latest version available.

FIG. 2 illustrates a set of tenants and targets that subscribe to a gold image and follow the updates to the latest version available. Gold image 200 includes a plurality of versions. Tenants 202a, 202b, and 202n include target software deployments that subscribe to gold image 200. For example, tenant 202a includes targets 204a, 204b, and 204c; tenant 202b includes target 206a, and tenant 202n includes targets 208a and 208b. As new versions of gold image 200 are published, the updates are deployed to the subscribed tenants and their corresponding targets. Thus, patches and other configurations may be applied a single time to gold image 200, which is then propagated to each of the subscribed targets. This allows targets across different tenants to be updated without each target having to individually pull and apply the patches.

In some instances, a tenant may be subscribed to multiple gold images. For example, a tenant may include a first set of targets that subscribe to gold image 200 and a second set of targets that subscribe to one or more other gold images different than gold image 200. Thus, software cloud services 160 may manage different flocking groups that belong to a single tenant.

Deployment of Cacheable Objects with Tenant-Specific and Target-Specific Configuration Data A particular software deployment may have product-specific configurations, tenant-specific configurations, and target-specific configurations. Product-specific configurations include patches, settings, and/or other software configurations that are tenant and target generic that may be applied to different deployments of the software product across different tenants and target host machines. Tenant-specific configurations, by contrast, include patches, settings, and/or other configurations to a software deployment that are specific to a particular tenant that may not be applicable to different tenants. Example tenant-specific configurations may include, without limitation, security settings, network settings, custom patches, etc. Target-specific configuration include patches, settings, and/or other configurations to a software deployment that are custom to a particular target or group of targets that may not be applicable to different deployments of the software product that belong to the same tenant. Target specific configuration may also include, without limitation, security settings, network settings (e.g., domain name configurations, etc.) and/or custom patches.

In one embodiment, image creation services 168 generates a cacheable object and custom configuration data that may be applied to the cacheable object by different tenants. The configuration data may include tenant-specific configuration data which may be different between different tenants to which the cacheable object is sent. In addition or alternatively, the configuration data may include target-specific configuration data, which may be different between different tenants and different targets that belong to a single tenant. As an example, the tenant and/or target-specific configuration data may comprise scripts, patches, or other files that may be run to configure the updated deployment embedded in the cacheable object.

Figure 3:
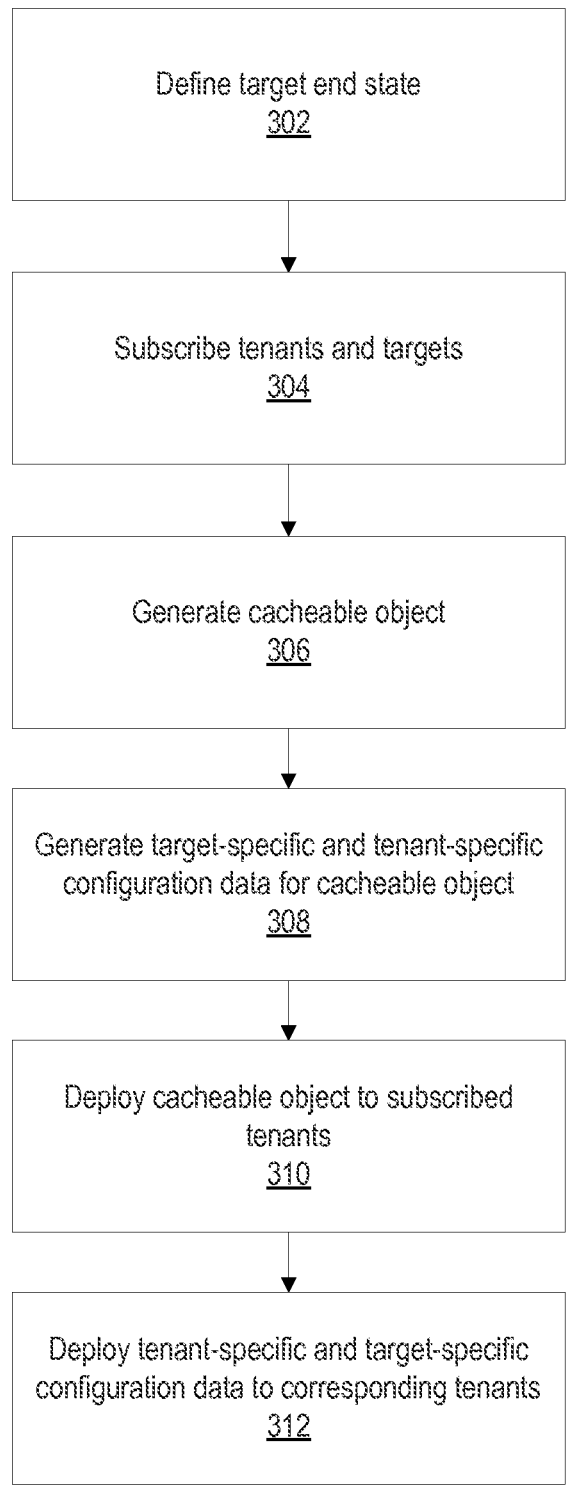
FIG. 3 illustrates an example process for deploying software updates to target software deployments that belong to a set of tenants.

FIG. 3 illustrates an example process for deploying software updates to target software deployments that belong to a set of tenants. At step 302, a target end state is defined by the network service. As described above, the target end state may identify source components and other configuration attributes for a software product to follow. The network service may compute the target end state using information obtained from one or more sources, which may include, without limitation, recommendations from a vendor of the software product, patch recommendations associated with support tickets, patches requested by a tenant, and/or patches identified from predictive performance and log analytics.

At step 304, one or more tenants and target software deployments subscribe to the target end state. A tenant is said to subscribe to the target end state if the tenant is associated with at least one software deployment that is subscribed to the target end state. As previously indicated, a tenant may subscribe to more than one target end state. For example, multiple set of target deployments may belong to a single tenant, where each set subscribes to a different target end state.

At step 306, the network service generates a cacheable object based on the target end state. In one embodiment, the cacheable object is a gold image. However, other cacheable data objects may be generated at this step, where the cacheable data object may be used by a tenant to install or update a version of a software product that satisfies the target end state.

At step 308, the network service generates target-specific and tenant-specific configuration data for the cacheable object. At this step, the network service may generate different target-specific configuration data for different respective subscribed targets, and different tenant-specific data for different respective subscribed tenants. As an example, the tenant-specific configuration data may define different software configurations for tenant 202a, tenant 202b, and tenant 202n based on policies that are custom to each tenant. Target-specific configuration data may define different software configurations for target 204a, 204b, 204c, etc. based on custom properties associated with each target.

At step 310, the network service deploys the cacheable object to the subscribed tenants. For example, the network service may send the cacheable object to a gateway associated with each subscribed tenant. Once received by the gateway, the tenant may use the cacheable object to update the subscribed software deployments.

At step 312, the network service deploys the tenant-specific and target-specific configuration data to corresponding tenants. While the cacheable object may be shared by the subscribed tenants, the tenant-specific and target-specific configuration data that is sent by the network service may be unique between different tenants. As with the cacheable object, the configuration data may be sent to the gateway of the corresponding tenant. Once the cacheable object has been used to update a subscribed software deployment, the tenant-specific and corresponding target-specific configuration data may be run to apply tenant and/or target-specific configurations to the software deployment.

Publication and Deployment Tracking Services

When a gold image or other cacheable object is updated, software management cloud services 160 may push the cacheable object to the tenants, or the tenants may download or "pull" the cacheable object from the cloud. In the pull context, publication services 172 may provide notifications to tenants 100a to 100n when an updated version of a gold image is available. In response to receiving a publication notification, the tenant may immediately begin download of the new version of the gold image, or the tenant may wait to download the gold image at a time that is more convenient, such as when datacenter usage is at a minimum or below average level.

Once a gold image is published, monitoring services 162 may track the update progress for the subscribed targets and tenants. Monitoring services 162 may maintain various data to track the progress of an update including, without limitation the following:

- Data indicating how many and which subscribed targets have been updated to the latest version of the gold image,
- Data indicating how many and which targets failed to update to the latest version of a gold image;
- Data indicating how many and which targets are still pending update; and
- A compliance rate indicating how many targets are currently running on the latest version of a gold image.

Figure 4:
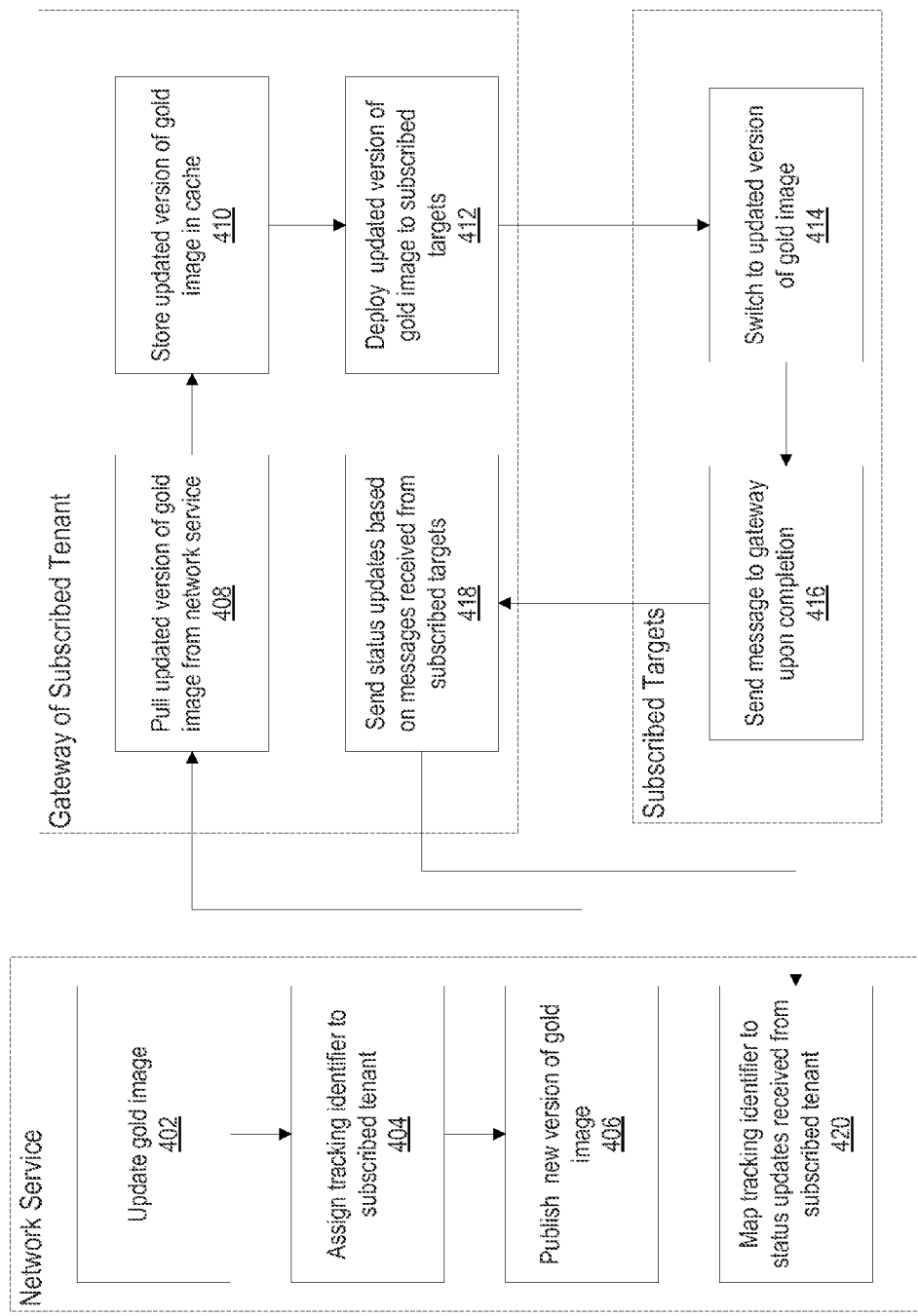
FIG. 4 illustrates an example process for monitoring and updating subscribed targets to a latest version of a gold image.

FIG. 4 illustrates an example process for monitoring and updating subscribed targets to a latest version of a gold image. At step 402, a network service updates the gold image. For example, the network service may apply newly released patches to a previous version of the gold image to generate the updated version of the gold image.

At step 404, the network service assigns a unique tracking identifier to each subscribed tenant that follows the gold image. The tracking identifier may be an alphanumeric string or some other value that associates a respective tenant with the progress of deploying the updated gold image by the respective tenant.

At step 406, the network service publishes the new version of the gold image. At this step, the network service may send a notification over network 108 to one or more subscribed tenants to indicate that the new version of the gold image is available for download. When there are multiple subscribed tenants, publication may be staggered as described in further detail below.

At step 408, the gateway of the subscribed tenant pulls the updated version of the gold image from the network service. The gateway may pull a binary payload or other cacheable object at this step along with tenant-specific and target-specific configuration data, if any.

At step 410, the gateway of the subscribed tenant stores the updated version of the gold image, including tenant-specific and target-specific data, if any, in a cache. By caching the data, the gold image may be downloaded by a tenant a single time and distributed to multiple subscribed targets that belong to the tenant. The tenant may also delay/stagger target updates until a convenient maintenance window as described further below.

At step 412, the updated version of the gold image is deployed to one or more subscribed targets that belong to the tenant. The gateway may publish the updated version of the gold image, allowing the subscribed targets to pull the object from the gateway, or the gateway may push the gold image to the targets, depending on the particular implementation.

At step 414, the subscribed targets switch to the updated version of the gold image. For example, the image may be deployed to a shadow home and subsequently activated such as described in U.S. application Ser. No. 14/660,679 entitled "Deployment and Activation of Updates on Target Hosts", or the cacheable object may immediately activated upon download, depending on the particular implementation. The subscribed target may further apply tenant-specific and/or target-specific configurations during the update process to make custom configurations to the deployment of the software product.

At step 416, when a subscribed target has successfully switched over to the updated version of the gold image, the subscribed target sends a status update message to the gateway indicating that the update is complete. If the subscribed target cannot successfully switch over to the updated version of the gold image, then the subscribed target may send a failure message if capable or the attempted update may timeout after a threshold period of time.

At step 418, the gateway sends status updates to the network service based on messages received from the subscribed targets. The status updates may generally indicate which of the subscribed targets have successfully switched over to the updated version of the gold image, which of the subscribed targets failed to switchover, and which of the subscribed targets still have updates pending.

At step 420, the network service receives the status updates from the gateway of the subscribed tenant. The network service may map the tracking identifier generated at step 404 to the information included in the status update messages. The network service may use the tracking identifier to determine the status of a gold image deployment on a subscribed tenant including which targets associated with the subscribed tenant were successful or unsuccessful switching over to the latest version of the gold image and which targets still have a pending update. The network service may determine the compliance rate of subscribed tenant by computing the number of subscribed targets associated with the tenant that were successfully updated versus the total number of subscribed targets associated with the tenant.

Staggered Publication and Deployment

Publication services 172 may stagger publication of a gold image to subscribed tenants in some instances. For example, publication services 172 may initially restrict publication of a new version of a gold image to a first set of subscribed tenants. Publication services 172 may then publish the gold image to a second set of subscribed tenants at a subsequent time, followed by a third set of subscribed tenants, etc. Staggered publication reduces the load on software management cloud services 160 and may be used to prioritize or test deployments of new versions of gold images.

Publication services 172 may determine whether to stagger publication and how to stagger publication of a gold image based on a set of one or more criteria associated with the gold image and/or its subscribed tenants. Example criteria may include, without limitation, priority information associated with the subscribed tenants, policy information associated with the subscribed tenants, and/or load balancing metrics such as network performance and other resource usage statistics. For instance, publication services 172 may publish a new version of a gold image in order of priority, where the new image version is first published to high priority tenants followed by lower priority tenants. As another example, publication services 172 may wait to publish an image until a certain time of day as specified in a tenant's policy information.

In addition or alternatively, deployment of a gold image may be staggered. As an example, once publication services 172 publishes an updated version of a gold image, the subscribed tenants may stagger the times at which they pull the updated version of the gold image from the cloud. For example, if tenant 100a and tenant 100n receive a publication notification at the same time that happens to be a reduced workload time for tenant 1 OOa and a peak resource time for tenant 100n, tenant 100a may immediately begin to pull the gold image into its gateway cache while tenant 100n may wait to pull the gold image until the workload is reduced.

Subscribed tenants may also stagger publication and/or deployment of cached images to the target software deployments, depending on the particular implementation. For example, different targets software deployments may have different peak usage times. Deployment logic 126 may stagger the publication and/or deployment of cached images 122 to different target software deployments that belong to tenant 100a based on respective workload and/or policies maintained by tenant 100a.

Compulsive Updates by Network Service

Staggered deployment provides flexibility to subscribed tenants and targets as to the timing of updates. However, some tenants may begin to fall further and further behind a target end state as new versions of a gold image are released. To prevent a target software deployment from falling behind, software management cloud services 160 and/or a subscribed tenant's gateway may push updates to subscribed tenants and/or targets.

The criteria for pushing or otherwise triggering an update to a new version of an image may vary from implementation to implementation. According to an embodiment, software management cloud services 160 may push a cacheable object to a subscribed tenant's gateway if the subscribed tenant has not downloaded the cacheable object within a threshold period of time. In another embodiment, software management cloud services 160 may push the cacheable object if the subscribed tenant has fallen behind by a threshold number of versions. For example, if the subscribed tenant has not downloaded the past two versions of a gold image, software management cloud services may trigger deployment of the cacheable object. Similarly, deployment logic 126 and 146 may push updates to respective target deployments if the target deployments have not been updated in a threshold period of time or have fallen behind by a threshold number of versions. The thresholds may vary depending on the particular implementation.

Metadata Sharing Across Different Tenants

In the inter-tenant context, tenants may share, via software management cloud services 160, restricted high-level information to encourage other tenants to update target deployments to catch up to the average tenant or to provide recommendations on how to improve the performance of target software deployments. The high-level information may be extracted from metadata collected by monitoring services 162. The information that is shared may be restricted to preserve the anonymity and privacy of each of the tenants.

The high level information that is extracted and shared from the collected metadata may vary from implementation to implementation. Examples may include without limitation, patch information identifying patches that have been applied to a target deployment, performance attributes of a target deployment, configuration attributes of a target deployment, and end state information identifying which the gold image to which a target deployment subscribes.

In order to protect sensitive information from being disclosed to other tenants, software management cloud services 160 may restrict which information may be shared across different tenants. As an example, software management cloud services 160 may remove, omit, or otherwise prevent sensitive target attributes associated with one tenant from being included in report data sent to another tenant. The sensitive parameters that are prevented from sharing may vary from implementation to implementation. Examples may include, without limitation, domain names, internet protocol addresses, customer names, security policies and other tenant-specific settings or attributes that might reveal an identity of the tenant. Cloud management services 160 may maintain a default security policy applicable to each tenant in a group of tenants to determine which information may be shared and which attributes are sensitive. In addition or alternatively, software management cloud services 160 may maintain tenant-specific policies that allow tenants to customize and tailor the information that may be shared with other tenants.

Figure 5:
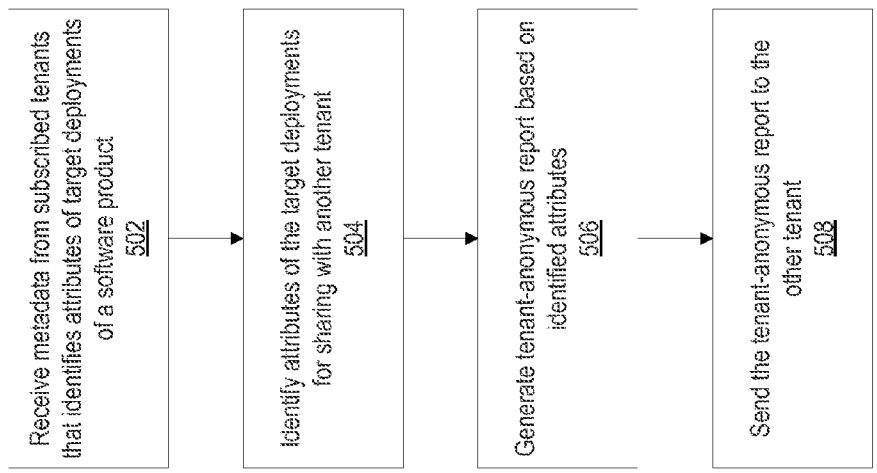
FIG. 5 illustrates an example process for sharing information about software deployments across different tenants without revealing sensitive information.

FIG. 5 illustrates an example process for sharing information about software deployments across different tenants without revealing sensitive information. At step 502, monitoring services 162 receives, from one or more tenants, metadata that identifies attributes of target deployments of a software product. The metadata may identify the source components of the target deployments including patch information and/or other configuration attributes, such as described above.

At step 504, reporting services 164 identifies attributes of the target deployments for sharing with another tenant. In one embodiment, reporting services 164 may search for tenant-anonymous attributes or other data that does not reveal an identity or other sensitive information about a tenant. "Tenant-anonymous" data may include patch and other configuration information that, if shared with another tenant, may improve performance of a software deployment of the other tenant in the cloud environment. Reporting services 164 may process data received by monitoring services 162 from monitoring agents 114 to determine the patches and other components from which target software deployments 112 are run.

At step 506, reporting services 164 generates tenant-anonymous report data based on the identified source components and/or other attributes of the target deployments. In this context, the report data is "tenant-anonymous" as the report data may include, identify or otherwise be based on source components of a tenant's target deployments without revealing the identity of the tenant or other sensitive tenant information. As an example, reporting services 164 may generate a tenant-anonymous report for tenant 100a based on metadata collected from tenant 100n by monitoring agents 134. However, information that may reveal the identity of tenant 100n is not included in the report data.

At step 508, reporting services 164 sends the tenant-anonymous report data to the other tenant. The report data may be displayed to the tenant through a graphical user interface (GUI), such as through a web browser or some other application's GUI, or through some other interface. The tenant may thus access and view the report data without compromising the privacy of other tenants. The report data that is generated and sent to the tenant during the process may vary from implementation to implementation. Examples are provided in further detail below.

According to one embodiment, the tenant-anonymous data sent to a tenant is combinable with tenant-specific data forms a tenant-specific deployment of software running in a computing environment to serve a particular tenant. As an example, the tenant-anonymous data may include a binary executable, a set of patches, or a set of software configuration files. The tenant-anonymous data may thus be used to install and/or update a software deployment that serves a tenant within the cloud environment or within the tenant's own datacenter. Configuration files, patches, settings and/or other data that is specific to the tenant may be applied on top of the tenant-anonymous patches to create a custom software deployment that is specific to the tenant.

Patch and Image Recommendations Based on Shared Information

In one embodiment, reporting services 164 may generate report data that recommends a set of one or more patches for a target software deployment. For instance, the report may identify patches by name, number, release date, and/or bug fix that are recommended for a particular target deployment. As another example, the report data may provide a link for installing the patches on one or more target deployments.

Figure 6:
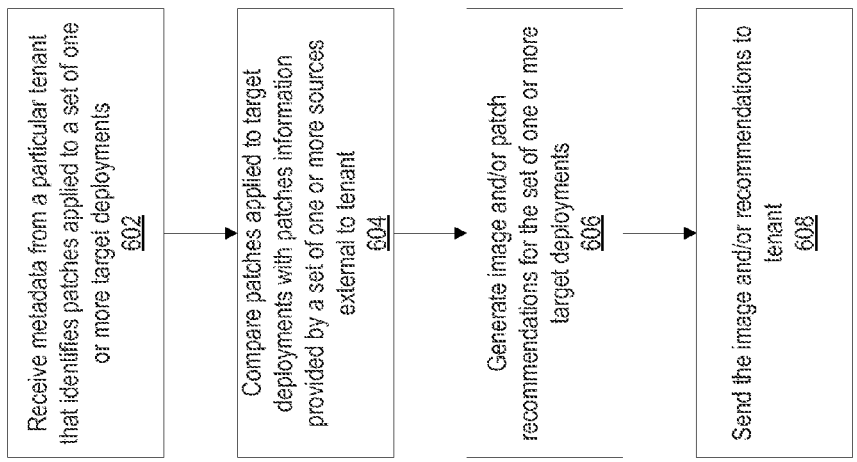
FIG. 6 illustrates an example process for identifying and recommending patches for a target software deployment.

FIG. 6 illustrates an example process for identifying and recommending patches for a target software deployment. At step 602, monitoring services 162 receives metadata from a particular tenant that identifies patches applied to a set of one or more target deployments.

At step 604, patch analytic services 166 analyzes the patch information of the target deployments by comparing the patches applied to the set of one or more targets with patch information provided by a set of one or more sources. The sources may include, without limitation, vendor recommended patches for a software product, patch information received for a tenant's support ticket, patch information from requests sent by the tenant, and/or patch information based on information collected from other tenants in the cloud environment.

At step 606, reporting services 164 generates report data recommending the identified patches and/or image creation services 168 creates a software image that has the identified patches applied. At step 608, the recommendations and/or image is sent to the tenant.

As indicated above, patch information may come from a variety of sources, including other tenants in a cloud environment. In one embodiment, patch analytic services 166 may analyze the patch information and associated log data to determine or predict how a particular patch affects performance of a tenant. A patch may improve the performance of a deployment if it fixes a bug, optimizes resource utilization, increases security, etc. Patches that improve performance for one tenant may be recommended to other tenants in the cloud environment. If a custom patch applied to a target deployment would not improve performance, then the patch may not be recommended.

Figure 7:
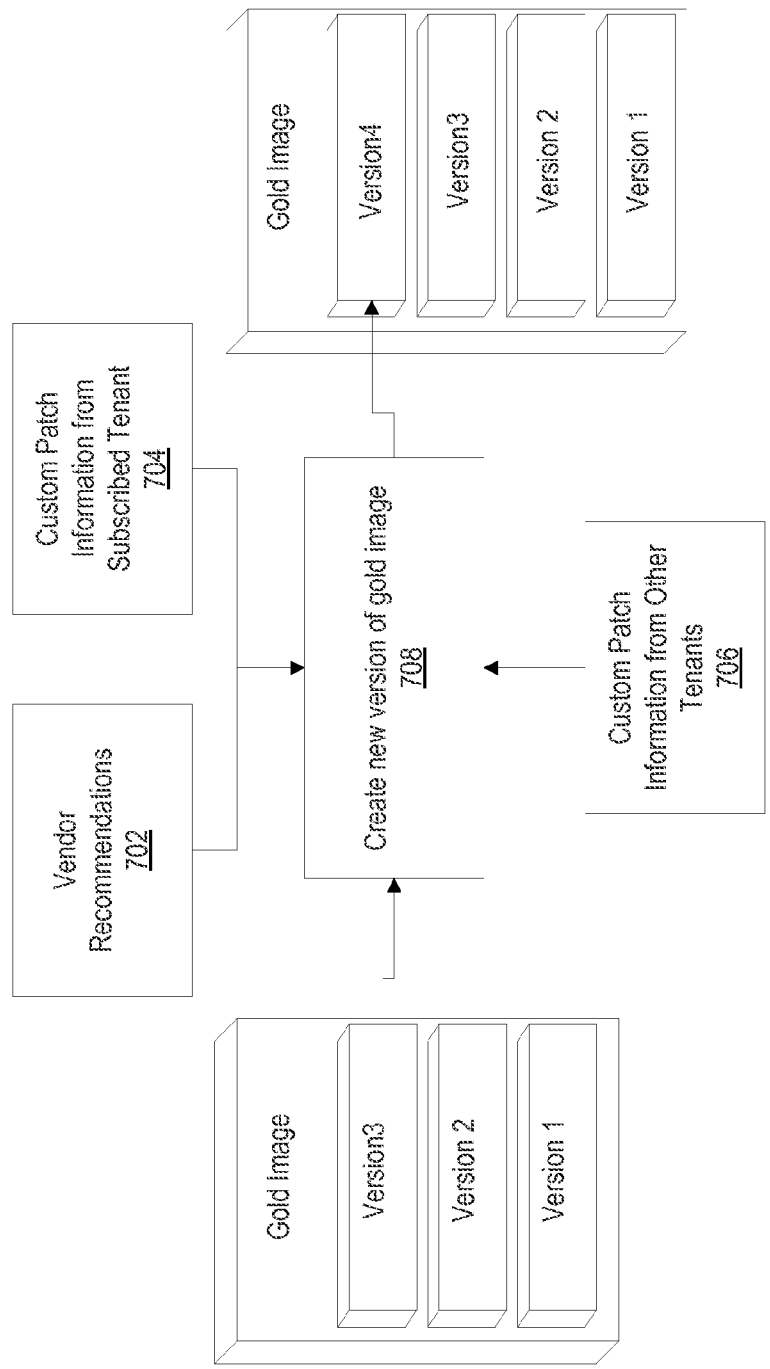
FIG. 7 illustrates the creation of a new version of a gold image using information obtained from different sources.

FIG. 7 illustrates the creation of a new version of a gold image using information obtained from different sources. Patch information is pulled from vendor recommendations (block 702), custom patch information from a subscribed tenant (block 704), and custom information from other tenants (block 706). The custom information from other tenants may come from other tenants that are subscribed to the same gold image and/or tenants that are not subscribed to the gold image, depending on the particular implementation.

In one embodiment, reporting services 164 may recommend that a tenant subscribe to a particular gold image based on shared metadata information. For instance, if tenant 100a is subscribed to a particular gold image and has a similar environment to tenant 100n, (e.g., the target deployments on each tenant share or substantially share the same classification attributes), then reporting services 164 may send tenant 100n a recommendation that target software deployments 132 subscribe to the same gold image. As with the other report data described herein, the recommendation may be tenant-anonymous so as not to reveal the identity of tenant 100a or other sensitive information.

Deployment Prevention Based on Shared Metadata

In one embodiment, reporting services 164 may recommend delaying an update based on shared metadata. As an example, based on metadata received from monitoring agents 114, monitoring services 162 may determine that a most recent update has failed to install or is otherwise not functioning properly on a threshold number of target software deployments that belong to tenant 100a. In response to determining that the update is not functioning properly on a threshold number for tenant 100a, software management cloud services 160 may recommend that target 100n delay or forego the most recent update. If the most recent image has not been published to tenant 100n, then publication services 172 may delay publishing the most recent gold image until the issues that caused the target software deployments not to function properly in tenant 100a are addressed.

Compliance Reports and Drift Management Services

In one embodiment, reporting services 164 may generate tenant-anonymous compliance reports that identify the compliance rates for tenants within the cloud environment. As an example, if tenant 100a subscribes to a particular gold image, but has not updated target software deployments 112 to the latest version of the gold image, reporting services 164 may send a report to tenant 100a indicating how far along the update process the average tenant is. If the average tenant has updated certain percentage of their subscribe targets, then this compliance percentage may be included in the report, without revealing the identity of the subscribed tenants. The compliance reports may be sent to encourage tenants to perform maintenance activities on target software deployments to keep up with the average tenant.

Drift management services 174 may perform functions related to reconciling rogue targets within tenants 100a to 100n. If a particular subscribed target has a rogue patch installed or is missing a patch, then drift management services 174 may reconcile the rogue such as described in U.S. application Ser. No. 14/603,804, entitled "Drift Management of Images". The tenant-anonymous report data may that is sent to the tenant may identify rogue patches.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
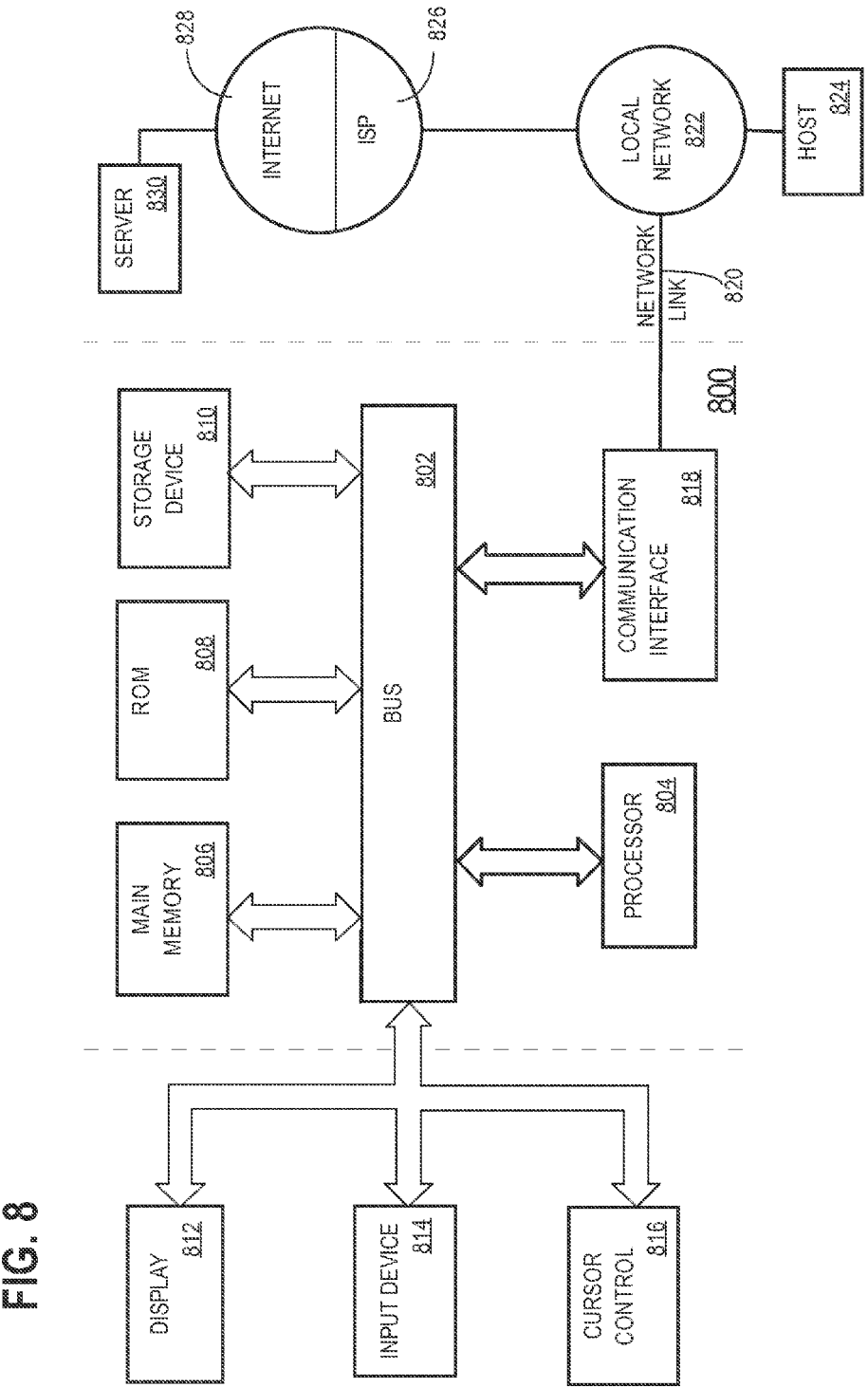
FIG. 8 illustrates an example computer system upon which an embodiment may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a liquid-crystal display (LCD) or a light-emitting diode (LED) display, for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks or magnetic disks, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

The term "logic" as used herein includes computer or electrical hardware component(s), firmware, a non-transitory computer readable medium that stores instructions, and/or combinations of these components configured to perform one or more functions or actions, and/or to cause one or more functions or actions from another logic, method, and/or system. Logic may include am microprocessor controlled by executable code, a discreet logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logic units are described, it may be possible to incorporate the multiple logic units into one physical logic component. Similarly, where a single logic unit is described, it may be possible to distribute the single logic unit between multiple physical logic components.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams.

The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   determining, by a network service, a target end state for a software product that is deployed by a plurality of tenants;
   generating, by the network service for the plurality of tenants, a cacheable object for updating the software product to the target end state;
   generating, by the network service for the plurality of tenants, tenant-specific configuration data for applying, to the cacheable object, configurations associated with respective tenants of the plurality of tenants and target-specific configuration data for applying, to the cacheable object, configurations associated with respective deployments of the software product;
   wherein tenant-specific configuration data for a particular tenant includes different configurations to the cacheable object than tenant-specific configuration data for one or more other tenants of the plurality of tenants;
   wherein target-specific configuration data for a particular target deployment of the software product for the particular tenant includes different configurations to the cacheable object than target-specific configuration data for one or more other target deployments of the software product for the particular tenant;
   sending the cacheable object from the network service to each tenant of the plurality of tenants;
   sending the tenant-specific configuration data and the target-specific configuration data from the network service to the particular tenant of the plurality of tenants.

2. The method of claim 1, wherein the tenant-specific configuration data includes configurations to the cacheable object that are applied to the particular target deployment and the one or more other target deployments of the software product for the particular tenant.

3. The method of claim 1, wherein the particular tenant has a plurality of deployments of the software product, the method further comprising generating, by the network service for each deployment of the plurality of deployments, different target-specific configuration data.

4. The method of claim 1, wherein the cacheable object is a gold image, the method further comprising maintaining, by the network service, subscription data that identifies which tenants are subscribed to follow changes to the gold image; wherein the plurality of tenants are subscribed to follow the gold image.

5. The method of claim 4, wherein generating, by the network service for the plurality of tenants, a cacheable object for updating the software product to the target end state comprises applying a set of one or more patches to a previous version of the gold image.

6. The method of claim 1, wherein the cacheable object is sent to the particular tenant at a different time than at least one other tenant in the plurality of tenants based on priority information maintained by the network service for the plurality of tenants.

7. The method of claim 1, wherein the particular tenant is associated with a gateway for storing the cacheable object and a plurality of target deployments, the method further comprising monitoring, by the network service, which target deployments of the plurality of target deployments have been updated using the cacheable object.

8. The method of claim 1, wherein sending the cacheable object from the network service to each tenant of the plurality of tenants comprises sending a notification to each tenant of the plurality of tenants that the cacheable object is available for download; wherein each tenant of the plurality of tenants downloads the cacheable object to a gateway.

9. The method of claim 1, further comprising determining whether the particular tenant has downloaded the cacheable object within a threshold period of time; wherein sending the cacheable object from the network service to the particular tenant is performed in response to determining that the particular tenant has not downloaded the cacheable object within the threshold period of time.

10. The method of claim 1, wherein the tenant-specific configuration data is generated based on settings associated with the software product that are custom to a particular tenant; wherein the target-specific configuration data is generated based on settings associated with the software product that are custom to a particular deployment of the software product.

11. A method comprising:
    receiving, by a network service from at least a first tenant of a set of one or more tenants, metadata that identifies a set of components for one or more deployments of a software product;
    generating, by the network service, tenant-anonymous data based on the set of components identified by the metadata for the one or more deployments of the software product;
    wherein the tenant-anonymous data does not reveal sensitive information for the first tenant of the set of one or more tenants and, when combined with tenant-specific data for a second tenant of the set of one or more tenants, forms a tenant-specific deployment of software running in a computing environment to serve the second tenant;
    sending the tenant-anonymous data from the network service to the second tenant.

12. The method of claim 11,
    wherein the set of components identified by the metadata includes a particular patch applied to at least one deployment of the one or more deployments of the software product;

wherein the tenant-anonymous data includes a recommendation for applying the particular patch to the tenant-specific deployment of the software product.

13. The method of claim 11, further comprising:
receiving, by a network service from the first tenant, metadata that identifies a particular set of components for a particular deployment of the software product;
comparing the particular set of components with the set of components for the one or more deployments of the software product;
wherein the tenant-anonymous data is further based on a result of said comparing the particular set of components with the set of components for the one or more deployments of the software product.

14. The method of claim 11, wherein the tenant-anonymous data identifies a set of one or more patches that have improved a performance of a at least one deployment of the one or more deployments.

15. The method of claim 11, wherein the first tenant and the second tenant are subscribed to a gold image for the software product; wherein the tenant-specific deployment and the one or more deployments are updated in response to an update to the gold image.

16. The method of claim 15, wherein the tenant-anonymous data identifies a status associated with updating the one or more deployments of the software product to a most recent version of the gold image.

17. The method of claim 11, wherein the first tenant of the set of one or more tenants is subscribed to a particular gold image; wherein the second tenant is not currently subscribed to the particular gold image; wherein the tenant-anonymous data recommends that the second tenant subscribe to the particular gold image.

18. The method of claim 11, wherein the tenant-anonymous data recommends that the second tenant delay an update of a software product in response to determining that the update has negatively impacted performance for at least one deployment of the one or more deployments of the software product.

19. The method of claim 11, wherein the tenant-anonymous data identifies one or more rogue patches applied to at least one deployment of the one or more deployments of the software product.

20. The method of claim 11, further comprising generating, by the network service, an updated version of a gold image for the second tenant based on the tenant-anonymous data.

21. One or more non-transitory computer-readable media storing instruction which, when executed by one or more processors, cause operations comprising:
determining, by a network service, a target end state for a software product that is deployed by a plurality of tenants;
generating, by the network service for the plurality of tenants, a cacheable object for updating the software product to the target end state;
generating, by the network service for the plurality of tenants, tenant-specific configuration data for applying, to the cacheable object, configurations associated with respective tenants of the plurality of tenants and target-specific configuration data for applying, to the cacheable object, configurations associated with respective deployments of the software product;
wherein tenant-specific configuration data for a particular tenant includes different configurations to the cacheable object than tenant-specific configuration data for one or more other tenants of the plurality of tenants;
wherein target-specific configuration data for a particular target deployment of the software product for the particular tenant includes different configurations to the cacheable object than target-specific configuration data for one or more other target deployments of the software product for the particular tenant;
sending the cacheable object from the network service to each tenant of the plurality of tenants;
sending the tenant-specific configuration data and the target-specific configuration data from the network service to the particular tenant of the plurality of tenants.

22. The one or more non-transitory computer-readable media of claim 21, wherein the tenant-specific configuration data includes configurations to the cacheable object that are applied to the particular target deployment and the one or more other target deployments of the software product for the particular tenant.

23. The one or more non-transitory computer-readable media of claim 21, wherein the particular tenant has a plurality of deployments of the software product, the instructions further causing operations comprising generating, by the network service for each deployment of the plurality of deployments, different target-specific configuration data.

24. The one or more non-transitory computer-readable media of claim 21, wherein the cacheable object is a gold image, the instructions further causing operations comprising maintaining, by the network service, subscription data that identifies which tenants are subscribed to follow changes to the gold image; wherein the plurality of tenants are subscribed to follow the gold image.

25. The one or more non-transitory computer-readable media of claim 24, wherein generating, by the network service for the plurality of tenants, a cacheable object for updating the software product to the target end state comprises applying a set of one or more patches to a previous version of the gold image.

26. The one or more non-transitory computer-readable media of claim 21, wherein the cacheable object is sent to the particular tenant at a different time than at least one other tenant in the plurality of tenants based on priority information maintained by the network service for the plurality of tenants.

27. The one or more non-transitory computer-readable media of claim 21, wherein the particular tenant is associated with a gateway for storing the cacheable object and a plurality of target deployments, the instructions further causing operations comprising monitoring, by the network service, which target deployments of the plurality of target deployments have been updated using the cacheable object.

28. The one or more non-transitory computer-readable media of claim 21, wherein sending the cacheable object from the network service to each tenant of the plurality of tenants comprises sending a notification to each tenant of the plurality of tenants that the cacheable object is available for download; wherein each tenant of the plurality of tenants downloads the cacheable object to a gateway.

29. The one or more non-transitory computer-readable media of claim 21, wherein the instructions further cause operations comprising: determining whether the particular tenant has downloaded the cacheable object within a threshold period of time; wherein sending the cacheable object from the network service to the particular tenant is performed in response to determining that the particular tenant has not downloaded the cacheable object within the threshold period of time.

30. The one or more non-transitory computer-readable media of claim 21, wherein the tenant-specific configuration data is generated based on settings associated with the software product that are custom to a particular tenant; wherein the target-specific configuration data is generated based on settings associated with the software product that are custom to a particular deployment of the software product.

31. One or more non-transitory computer-readable media storing instruction which, when executed by one or more processors, cause operations comprising:
receiving, by a network service from at least a first tenant of a set of one or more tenants, metadata that identifies a set of components for one or more deployments of a software product;
generating, by the network service, tenant-anonymous data based on the set of components identified by the metadata for the one or more deployments of the software product;
wherein the tenant-anonymous data does not reveal sensitive information for the first tenant of the set of one or more tenants and, when combined with tenant-specific data for a second tenant of the set of one or more tenants, forms a tenant-specific deployment of software running in a computing environment to serve the second tenant;
sending the tenant-anonymous data from the network service to the second tenant.

32. The one or more non-transitory computer-readable media of claim 31,
wherein the set of components identified by the metadata includes a particular patch applied to at least one deployment of the one or more deployments of the software product;
wherein the tenant-anonymous data includes a recommendation for applying the particular patch to the tenant-specific deployment of the software product.

33. The one or more non-transitory computer-readable media of claim 31, wherein the instructions further cause operations comprising:
receiving, by a network service from the first tenant, metadata that identifies a particular set of components for a particular deployment of the software product;
comparing the particular set of components with the set of components for the one or more deployments of the software product;
wherein the tenant-anonymous data is further based on a result of said comparing the particular set of components with the set of components for the one or more deployments of the software product.

34. The one or more non-transitory computer-readable media of claim 31, wherein the tenant-anonymous data identifies a set of one or more patches that have improved a performance of a at least one deployment of the one or more deployments.

35. The one or more non-transitory computer-readable media of claim 31, wherein the first tenant and the second tenant are subscribed to a gold image for the software product; wherein the tenant-specific deployment and the one or more deployments are updated in response to an update to the gold image.

36. The one or more non-transitory computer-readable media of claim 35, wherein the tenant-anonymous data identifies a status associated with updating the one or more deployments of the software product to a most recent version of the gold image.

37. The one or more non-transitory computer-readable media of claim 31, wherein the first tenant of the set of one or more tenants is subscribed to a particular gold image; wherein the second tenant is not currently subscribed to the particular gold image; wherein the tenant-anonymous data recommends that the second tenant subscribe to the particular gold image.

38. The one or more non-transitory computer-readable media of claim 31, wherein the tenant-anonymous data recommends that the second tenant delay an update of a software product in response to determining that the update has negatively impacted performance for at least one deployment of the one or more deployments of the software product.

39. The one or more non-transitory computer-readable media of claim 31, wherein the tenant-anonymous data identifies one or more rogue patches applied to at least one deployment of the one or more deployments of the software product.

40. The one or more non-transitory computer-readable media of claim 31, wherein the instructions further cause operations comprising: generating, by the network service, an updated version of a gold image for the second tenant based on the tenant-anonymous data.

* * * * *

UNITED STATES PATENT AND TRADEMARK OFFICE
CERTIFICATE OF CORRECTION

PATENT NO. : 9,904,534 B2
APPLICATION NO. : 14/849467
DATED : February 27, 2018
INVENTOR(S) : Kuchibhotla et al.

Page 1 of 1

It is certified that error appears in the above-identified patent and that said Letters Patent is hereby corrected as shown below:

In the Specification

In Column 11, Line 8, delete "1 OOa" and insert -- 100a --, therefor.

Signed and Sealed this
Twenty-eighth Day of August, 2018

Andrei Iancu
*Director of the United States Patent and Trademark Office*